(12) United States Patent
Matta

(10) Patent No.: US 7,525,923 B2
(45) Date of Patent: Apr. 28, 2009

(54) CATPROBE

(75) Inventor: Johnny M. Matta, San Jose, CA (US)

(73) Assignee: NTT DoCoMo, Inc., Tokyo (JP)

( * ) Notice: Subject to any disclaimer, the term of this patent is extended or adjusted under 35 U.S.C. 154(b) by 982 days.

(21) Appl. No.: 10/185,131

(22) Filed: Jun. 28, 2002

(65) Prior Publication Data
US 2004/0001511 A1    Jan. 1, 2004

(51) Int. Cl.
*H04L 12/26* (2006.01)
(52) U.S. Cl. ......................... 370/252; 370/465
(58) Field of Classification Search ............... 370/465, 370/252
See application file for complete search history.

(56) References Cited

U.S. PATENT DOCUMENTS

| | | | | |
|---|---|---|---|---|
| 6,215,772 | B1 * | 4/2001 | Verma ................ | 370/236 |
| 6,498,782 | B1 * | 12/2002 | Branstad et al. ........ | 370/231 |
| 6,760,768 | B2 * | 7/2004 | Holden et al. ......... | 709/227 |
| 7,068,677 | B1 * | 6/2006 | Arai et al. ........... | 370/447 |
| 7,088,706 | B2 * | 8/2006 | Zhang et al. ......... | 370/352 |
| 2002/0055999 | A1 * | 5/2002 | Takeda .............. | 709/224 |
| 2002/0133614 | A1 * | 9/2002 | Weerahandi et al. ..... | 709/237 |
| 2003/0016630 | A1 * | 1/2003 | Vega-Garcia et al. .... | 370/252 |
| 2003/0040320 | A1 * | 2/2003 | Lucidarme et al. ...... | 455/452 |
| 2003/0152034 | A1 * | 8/2003 | Zhang et al. ......... | 370/252 |
| 2003/0236827 | A1 * | 12/2003 | Patel et al. .......... | 709/203 |
| 2004/0025018 | A1 * | 2/2004 | Haas et al. .......... | 713/168 |
| 2004/0146056 | A1 * | 7/2004 | Martin .............. | 370/401 |
| 2004/0210632 | A1 * | 10/2004 | Carlson et al. ......... | 709/203 |
| 2005/0108420 | A1 * | 5/2005 | Brown et al. ......... | 709/232 |
| 2005/0111487 | A1 * | 5/2005 | Matta et al. .......... | 370/468 |

FOREIGN PATENT DOCUMENTS

JP    A-2000-224172    11/2000

OTHER PUBLICATIONS

E. Crawley, R. Nair, B. Rajagopalan, H. Sandick, "A framework for QoS-based routing the Internet", *RFC 2386*, Aug. 1998.
Caida, "DOE SCiDAC bandwidth estimation project: Goals and objectives", online documentation, http://www.caida.org/projects/bwest/plan.xml.
AT&T Research, "Network measurement tools . . . unclogging network traffic jams", online documentation, http://www.research.att.com/projects/NetworkMeasurementTools/.

(Continued)

*Primary Examiner*—Chi H Pham
*Assistant Examiner*—Mohammad S Adhami
(74) *Attorney, Agent, or Firm*—Blakely, Sokoloff, Taylor & Zafman LLP

(57) ABSTRACT

A method of estimating bandwidth capacity, available bandwidth and utilization along a path in an IP network is disclosed. ICMP time-stamp requests are sent from a source host on the edge or inside the network to all routers on the end-to-end path to a desired destination. Differences between time-stamp values are used as indicators of QoS service at each router. The collected measurements are then processed at the sending host to infer QoS parameters in terms of path capacity in bit/sec, available bandwidth in bits/sec, individual link utilization and congestion at each router. These parameters can be combined to infer the QoS service in terms of bandwidth on the end-to-end path.

50 Claims, 3 Drawing Sheets

OTHER PUBLICATIONS

N. McKeown, "EE384x: Packet switch architectures", online documentation, http://www.stanford.edu/class/ ee384x/.

M. Jain, C. Dovrolis, "End-to-end available bandwidth: Measurement methodology, dynamics, and relation with TCP throughput", *Proc. of ACM Sigcomm 2002*, in press.

M. Jain, C. Dovrolis, "Pathload: a measurement tool for end-to-end available bandwidth", *Proc. of PAM 2002*.

S. Keshav, "A control-theoretic approach to flow control", *Proc. of ACM Sigcomm 1991*.

J. Postel, "Internet control message protocol", *RFC 792*, Sep. 1981.

K. Lai, M. Baker, "Measuring link bandwidths using a determinisitic model of packet delay", *Proc. of ACM SIGCOMM 2000*.

Caida, "Packet wingspan distribution: assessing average hop count of a wide area Internet packet", online documentation, http://www.nlanr.net/NA/Learn/wingspan.html.

K. Lai, M. Baker, "Nettimer: A tool for measuring bottleneck link bandwidth", *Proc. of 3rd USENIX Symposium on Internet Technologies and Systems*, Mar. 2001.

C. Dovrolis, P. Ramanathan, D. Moore, "What do packet dispersion techniques measure?", *Proc . . . of Infocom 2001*.

Vern Paxson, "End-to-end internet packet dynamics", *IEEE/ACM Transactions on Networking*, vol. 7, No. 3, pp. 277-292, Jun. 1999.

R. Carter, M. Crovella, "Measuring bottleneck link speed in packet-switched networks", *Technical Report BU-CS-96-006*, Boston University, Mar. 1996.

G. Jin, G. Yang, B. Crowley, D. Agarwal, "Network Characterization Service (NCS)", *In proc. 10th IEEE Symposium on High Performance Distributed Computing*, Aug. 2001.

Allen B. Downey, "Using pathchar to estimate internet links characteristics", *Proc. of ACM SIGCOMM 1999*.

T. Oetiker, "MRTG: Multi Router Traffic Grapher", http://ee-staff.ethz.ch/~oetiker/webtools/mrtg/mrtg.html.

Y. Zhang, N. Duffield, V. Paxson, and S. Shenker, "On the Constancy of Internet Path Properties", *Proc. of ACM SIGCOMM Internet Measurement Workshop*, Nov. 2001.

C. Casetti, J.C. De Martin, M. Meo, "A Framework for the Analysis of Adaptive Voice over IP", IEEE ICC 2000, Jun. 18-22, 2000.

K. M. Hanna, N. Natarajan, B. N. Levine, "Evaluation of a novel two-step server selection metric", *Proc. International Conference on Network Protocols (ICNP)*, Oct. 2001.

J. C. Bolot, T. Turletti, "A rare controlled mechanism for packet video in the Internet", *Proc. of IEEE Infocom*, Jun. 1994.

P. Francis et al, "IDMaps: A global Internet host distance estimation service", *IEEE/ACM Transactions on Networking*, Oct. 2001.

M. Karam, F. Tobagi, "Analysis of the delay and jitter of voice traffic over the internet", *Proc. of Infocom 2001*.

Azamino Aoba, "Lecture for Tricks and Tips", Asahi Pasocon, The Asahi Shimbun, No. 333, May 15, 2003, pp. 46-47.

Japanese original and English translation of office action dated Jan. 20, 2008 for Japanese Patent Application No. 2003-185272, 6 pages.

\* cited by examiner

CATPROBE

FIELD OF THE INVENTION

The present invention relates generally to IP communication networks and more particularly to a quality of service estimation method for communication paths on IP networks.

BACKGROUND OF THE INVENTION

The "best-effort" nature of the Internet makes the QoS (Quality of Service) perceived by end users unpredictable and sometimes largely varying. Fast, accurate and efficient tools for estimating QoS performance of IP networks are gaining importance in the networking community. This is because such information can be used to maintain expected user and provider service under the varying conditions inherent to packet networks, especially the Internet. Specific applications include congestion control, real-time streaming and two-way communication, QoS verification, server selection and network administration.

QoS estimation can be broadly classified into two categories: passive monitoring and active monitoring. The passive monitoring approach has the advantage of not injecting additional probing traffic into the network. It observes the network as it is, meaning that the measurements are an assessment of true network behavior since this latter is not disturbed by probing traffic intended for those measurements.

The monitoring can take different levels of granularity depending on the degree of processing, storage and resources available. Packet monitoring for example allows observation of packet-by-packet information such as packet delay variation, packet size distribution, and throughput between host pairs. Higher level, with less overhead, can be achieved by flow level measurements to record the total number of bytes transferred, the flow start and finish time, among others.

The main advantage of passive probing techniques is that they do not introduce a load on the network they monitor, which also means they do not distort the network traffic and therefore produce realistic estimates. However their handicap is that they rely on existing traffic, which is not guaranteed to have desired characteristics for certain measurements. Bottleneck bandwidth measurement techniques for example require a certain packet size distribution and inter-packet departure rate often not met. Traffic monitoring consists in passively observing traffic characteristics for the purpose of inferring network performance.

SNMP (Simple Network Management Protocol) and RMON (Remote Monitoring) are the most widely adopted standards for passive monitoring and typically consist of management agents or probes installed at various network elements (hosts, routers, switches), a MIB (management information base) containing collected data from the agents, a management station or console, which collects the information from the probes, and a protocol for the exchange of information between stations and probes. MIBs comprise several groups such as statistics collected at the physical or IP layers for packet sizes, CRC errors, and so forth. Traffic monitoring with administrative control requires the transfer of collected information from agents to consoles, thus placing a burden on the network being monitored. Sometimes, sampling of data in MIBs can be used to reduce the amount of traffic exchanged.

Active monitoring is the inference of network QoS by sending probes across the network and observing the treatment they receive in terms of delay in delivery to the destination, variability in that delay and loss. A large variety of such tools exist to estimate performance in terms of delay, jitter, packet loss, and bandwidth. They generally either use Internet Control Message Protocol (ICMP) error messaging capabilities or packet dispersion techniques.

Link capacity estimation in bits/sec has traditionally been achieved through the use of packet dispersion techniques, which consist in the successive transmission of groups of two or more packets. The concept is that packets from the same group will queue one after another at the bottleneck link of the path. With the absence of large interference from competing traffic (i.e. from other sources), the dispersion (i.e. the difference in packet arrival times at the receiver) will be inversely proportional to the bandwidth of the bottleneck. Examples of tools using this approach include Nettimer, Pathrate and Packet Bunch Mode (PBM).

Another approach for capacity estimation builds on the ICMP Time Exceeded message option. Pathchar, the precursor of this technique, performs measurements by sending packets with increasing IP Time-to-Live (TTL) values thus forcing routers along the path to send back ICMP error messages and revealing themselves. A measurement of round-trip delays to successive hops on the end-to-end path thereby leads to per hop delay estimation. Pathchar also adds the feature of varying packet sizes for each TTL value, thus inferring link capacity as the slope inverse of the line connecting minimum observed delay for each packet size. Other tools exist like Pchar and Clink but they build on the same concepts as Pathchar.

Cprobe and Pipechar were the first tools proposed to estimate available bandwidth on a path. These tools use long packet train dispersion and assume that dispersion of such trains is inversely proportional to the rate available for transmission at the bottleneck hop, i.e., available bandwidth. Recent research, however, has shown that the inverse of such dispersions does not in fact measure available bandwidth but another parameter referred to as ADR (Asymptotic Data Rate).

Another tool, Delphi, assumes Internet paths can be modeled by a single queue, which makes it perform badly in the presence of large queuing delays at several links on the path or when the bottleneck capacity and bottleneck available bandwidth links are located at different links.

At the present time, there is only one known tool that is capable of estimating available bandwidth, which is Pathload. It builds on the simple principle that the observed end-to-end delay at the receiver increases when the transmission rate at the source exceeds the available bandwidth on the path; a realistic observation knowing that traffic injected onto the path faster than the bottleneck can service will cause queue build up at that hop, hence increasing queuing delay and delay altogether.

Pathload operates by performing several iterations, varying the transmission rate at each and observing delay variation at the receiver. The point is to find the maximum rate that does not cause delay increase.

SUMMARY OF THE PRESENT INVENTION

The present invention discloses a method of producing QoS estimates for communication paths in IP networks, which is preferentially between two given routers or hosts on an IP network. The QoS estimation technique is used on a regular basis to poll a desired transmission path. The preferred method consists of first identifying network addresses of all routers or hosts on the end-to-end path of interest, then transmitting pairs of time-stamp requests to each router or host on the end-to-end path. Finally, the method requires processing of the time-stamp requests that are returned by the routers or hosts to produce QoS estimates. For the purpose of the present invention, the term "hop" will be used to collectively refer to routers and hosts along the end-to-end path between respective terminals or nodes.

In the preferred embodiment, the technique to obtain addresses of hops on the path is to use a Traceroute application. In addition, time-stamp requests are obtained using ICMP time-stamp request/reply options. The present invention starts by using Traceroute to determine the addresses of all hops on the desired path. Then, a group of five ICMP time-stamp requests is preferentially sent from the source at one end of the path to each router on the desired path. The first three packets of each group are used to determine initial conditions for the measurement to the corresponding host or router (i.e., hop on the path). The remaining two probing packets of the group of five are used to obtain an estimate of the total time spent by an ICMP request packet at the corresponding hop.

Another pair of similar ICMP time-stamp request packets is sent to each hop at a regular interval to similarly estimate the total time spent by an ICMP request packet at each hop. Such successive measurements are used to infer queuing delay variation at each hop. In the preferred embodiment of the present invention, the estimates are formed at the originating source or node. In yet another preferred embodiment, such estimates are formed at the receiver or destination node.

In the preferred embodiment of the present invention, the total service time at each hop and the queuing delay variation are used to estimate the utilization in the direction of the path at each hop, which refers to the fraction of free transmission resources not used by competing traffic at the link. The estimates that are formed are also used to estimate the available bandwidth of each link in the direction of the path, which refers to the rate the link can further sustain without the occurrence of congestion and queue build up at the link. In addition, estimates are used to estimate the rate of incoming traffic from competing sources to the link.

In the preferred embodiment of the present invention, the proposed application resides at one node only that originates the QoS measurement. This node performs the processing required to deduce QoS estimates based on collected time-stamp values from the hops. In another preferred embodiment, the proposed application can reside at both source and receiver on the path of interest. In that case, the receiver will be in charge of processing the collected time-stamps and processing them. The difference is now that ICMP packets sent to routers have an address spoofed to the destination such that replies are sent to the receiver instead of the source, which would have originated the ICMP requests.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
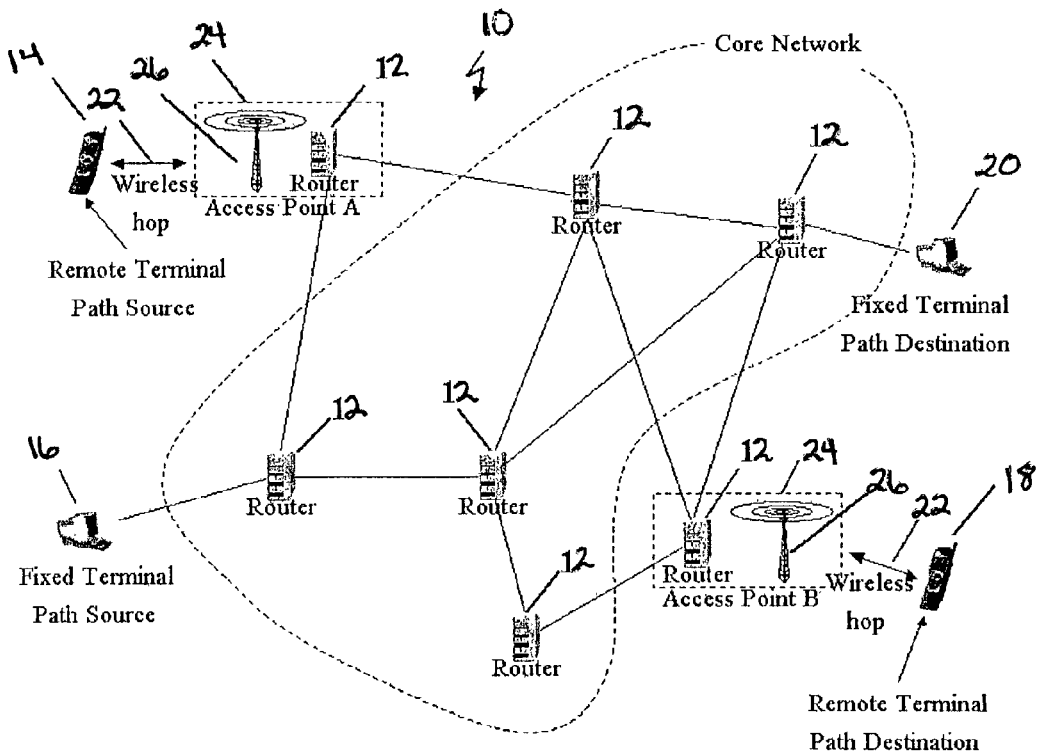
FIG. 1 depicts an example of an IP network.

Referring to FIG. 1, an IP network 10 is generally illustrated that includes a plurality of hosts or routers 12 and at least two terminals or nodes communication with each other through respective hosts or routers 12 on the IP network 10. The collection of hosts or routers 12 and terminals or nodes at each end and the links connecting them constitute a path. When transmitting, a datagram will make several hops in order to reach its destination. These hops may be across hosts or routers 12 and, as such, as used herein, the term hop should be construed to include both hosts and routers 12. The transmitting node or terminal can be referred to as a path source (or source, in short) and the receiving node or terminal can be referred to as the destination path (or destination, in short). As illustrated, source terminals can either be remote terminals 14 or fixed terminals 16. Likewise, destination terminals can be either remote terminals 18 or fixed terminals 20.

Fixed terminals 16, 20 directly connect through a fixed link to a respective router 12. Remote terminals 14, 18 connect through a wireless hop 22 to an access point 24 that preferentially includes a wireless communication tower 26 and a router 12. Remote terminals 14, 18 are illustrated as wireless telephones, but those skilled in the art would recognize that other remote terminals such as personal digital assistants (PDA) or laptops might be used on the wireless IP network 10. As such, the depiction of a wireless telephone in FIG. 1 should be viewed in an illustrative sense and not as a limitation of the present invention. As further illustrated in FIG. 1, each router 12 is connected to at least one other router 12 to enable IP packet transmission among terminals across the IP network 10.

Figure 2:
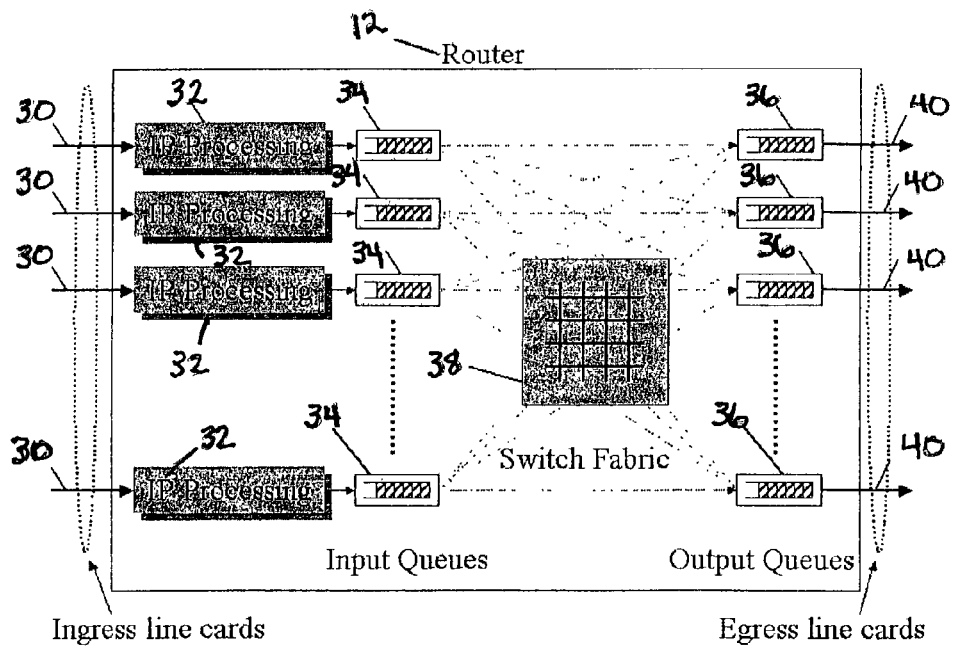
FIG. 2 depicts an example of router packet processing details.

Referring to FIG. 2, typical IP packet processing in a router 12 is illustrated. IP packets arrive at a plurality of ingress line cards 30 and enter an IP processing stage 32. Packets are then typically placed in an input queue 34 or an output queue 36, depending on the specific implementation of the router 12. A switch fabric 38 directs packets to an appropriate egress line card 40. Queuing can be at either the input to the switch fabric 38 or the output (although most modern routers implement input queuing). However, it always occurs after IP processing 32. As set forth in greater detail below, in the case of use of the ICMP time-stamp option, the time-stamp retrieved by the ICMP time-stamp request records the time before entry into the input or output queues 34, 36. The IP processing time is small since packets are usually handled at wire speed at that stage so that waiting time and the actual processing time for the IP processing stage 32 are negligible compared to queuing in the switch fabric 38 and transmission time at the egress line cards 40. Queuing of a packet after IP processing 32 is due to waiting time of other packets to reach their turn for transmission. Queuing latency directly relates to the size of the queue upon arrival of the packet under consideration and the transmission speed of the link; the packet needs to wait for the queue ahead to empty before it can be transmitted.

In the discussion set forth below, the following notations are used and refer to the following items: $t_n$ or n in short is the continuous time at which an event is recorded; $Q_i(n)$ the size in bits of the queue in link i at time n; $B_i$ the capacity of link i in bits/sec; $R_i(n)$ the sum of all incoming flow rates to the queue in link i in bits/sec at time n; $q_i(n)$ the queuing delay in router i at time n; $u_i(n)$ the utilization of link i at time n; and m is the packet size in bits.

For a packet entering the queue at time n, the size of the queue ahead of it is $Q_i(n)$. The queuing delay $q_i(n)$ of that packet is the time required to empty the queue in link i at rate $B_i$ (i.e., the queuing delay of the packet), which can be represented as:

$$q_i(n) = \frac{Q_i(n)}{B_i} \qquad (1)$$

Rate $B_i$ is referred to as capacity, the total bit forwarding speed of a link. In other words, it is the transmission rate of the link. This value is therefore fixed for a given router 12 and network wire configuration.

Figure 3:
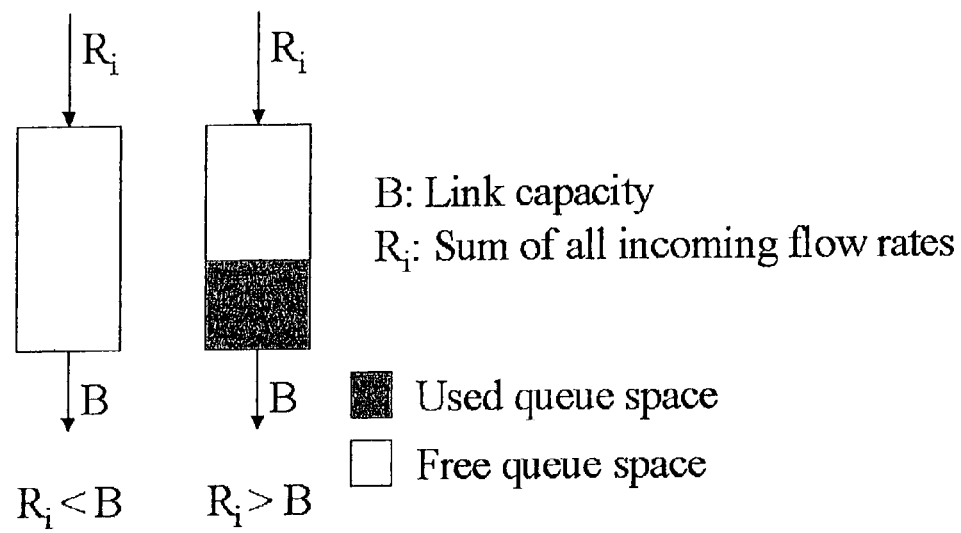
FIG. 3 depicts an example variation of queue size with incoming rate.

FIG. 3 depicts the change in queue size (hence, queuing time) with the variation of incoming flow rates. As long as $R_i$ is less than the speed $B_i$ at which the link can serialize bits on the output linecard 40, the queue size will not increase. However, because of the bursty nature of Internet traffic, it is possible that $R_i$ may exceed the capacity $B_i$, thereby causing queue build up. For the purpose of the present invention, the utilization of link i at time n is defined by:

$$u_i(n) = R_i(n)/B_i \qquad (2)$$

Referring to FIG. 3, the following equation can be obtained:

$$Q_i(n) = \max\left\{\sum_{r=1}^{n}[R_i(r) - B_i](t_r - t_{r-1}), 0\right\} \qquad (3)$$

or:

$$Q_i(n) = \max\{[R_i(n) - B_i](t_n - t_{n-1}) + Q_i(n-1), 0\} \qquad (4)$$

where, for simplicity, it is assumed that upon network initialization at time zero, the queue at all links is empty hence $Q_i(0) = 0, \forall i$.

Note that the time interval $[t_{r-1}, t_r)$ is not set to unity since this interval will be varied later. Using equations (1) and (3):

$$q_i(n) = \frac{\max\left\{\sum_{r=1}^{n}[R_i(r) - B_i](t_r - t_{r-1}), 0\right\}}{B_i} \qquad (5)$$

Using equations (1) and (4):

$$q_i(n) = \max\left\{\frac{[R_i(n) - B_i](t_n - t_{n-1})}{B_i} + q_i(n-1), 0\right\} \qquad (6)$$

Substituting equation (2) in (6) results in:

$$q_i(n) = \max\{[u_i(n) - 1](t_n - t_{n-1}) + q_i(n-1), 0\} \qquad (7)$$

Hence:

$$u_i(n) = \max\left\{\frac{[q_i(n) - q_i(n-1)]}{(t_n - t_{n-1})} + 1, 0\right\} \qquad (8)$$

The traversing time $T_i(n)$ is the time needed for a chunk of m bits to traverse a link at time n, namely:

$$T_i(n) = \frac{m}{B_i} + q_i(n) \qquad (9)$$

The figure m/B, is also referred to as transmission time of the link; traversing time as defined herein is therefore the sum of transmission and queuing delays while neglecting propagation and processing delays. Using equation (7) in (9):

$$T_i(n) = \frac{m}{B_i} + \max\{[u_i(n) - 1] \times (t_n - t_{n-1}) + q_i(n-1), 0\}$$

Hence:

$$B_i = \frac{m}{T_i(n) - \max\{[u_i(n) - 1](t_n - t_{n-1}) - q_i(n-1), 0\}} \qquad (10)$$

Then, substituting equation (2) in (10):

$$R_i = \frac{u_i(n)m}{T_i(n) - \max\{[u_i(n) - 1](t_n - t_{n-1}) - q_i(n-1), 0\}} \qquad (11)$$

Available bandwidth for a new flow is the rate a link can support such that the queue size (i.e. queuing delay) does not increase. In other words, available bandwidth is the fraction of the capacity B of the link that is not used by competing flows with sum of rates R:

$$AvBw_i(n) = B_i - R_i(n) \qquad (12)$$

Substituting equation (2) in (12) yields:

$$AvBw_i(n) = B_i[1 - u_i(n)]$$

$$u_i(n) \leq 1 \qquad (13)$$

$AvBw_i(n)$ is the available bandwidth of link i at time n.

The available bandwidth metric can be used to assess the margin of additional input flows the path can take before congestion starts building up, hence leading to increased delay and jitter. Bandwidth requirements for voice coders, for example, are in terms of available bandwidth.

Throughput is usually measured by observing the time required to get a certain amount of bits across a link or path. As such, throughput is the ratio of bits to total time to get them through. Throughput of link i as measured at the receiver can therefore be written as follows:

$$ThrBw_i(n, k) = \frac{k}{\frac{k}{B_i} + q_i(n)} \qquad (14)$$

where $ThrBw_i(n,k)$ is throughput in bits/sec in link i at time n, k the size in bits of the data packets observed, which is also referred to as a data chunk (possibly composed of packets of different sizes), $B_i$ the link capacity and $q_i$ the queuing delay of the k bits chunk at the link.

Over a path comprised of several links, and using equation (14) the throughput equation becomes:

$$ThrBw_{path}(n, k) = \frac{k}{\sum_{i \varepsilon path}[k/B_i + q_i(n)]} = \frac{1}{\sum_{i \varepsilon path} \frac{1}{ThrBw_i(n,k)}} \quad (15)$$

The denominator on the right-hand side of equation (15) actually corresponds to the delay needed to traverse a link and path respectively. Throughput is therefore a good indicator of delay conditions in the network. As such, throughput does not in itself describe capacity or available bandwidth of the links or path as defined herein. It does relate to those metrics, however, in the following way:

Equations (2) and (5) in the continuous domain also give:

$$q_i(n) = \max\left\{\int_{t_0}^{t_n}[u_i(r) - 1]dr, 0\right\}$$

Then, using equation (13):

$$q_i(n) = \max\left\{-\int_{t_0}^{t_n}\frac{AvBw_i(r)}{B_i}dr, 0\right\}$$

Finally, this result in equation (14) gives:

$$ThrBw_i(n,k) = \max\left\{\frac{B_i}{1 - \frac{1}{k}\int_{t_0}^{t_n}AvBw_i(r)dr}, B_i\right\} \quad (16)$$

Figure 4:
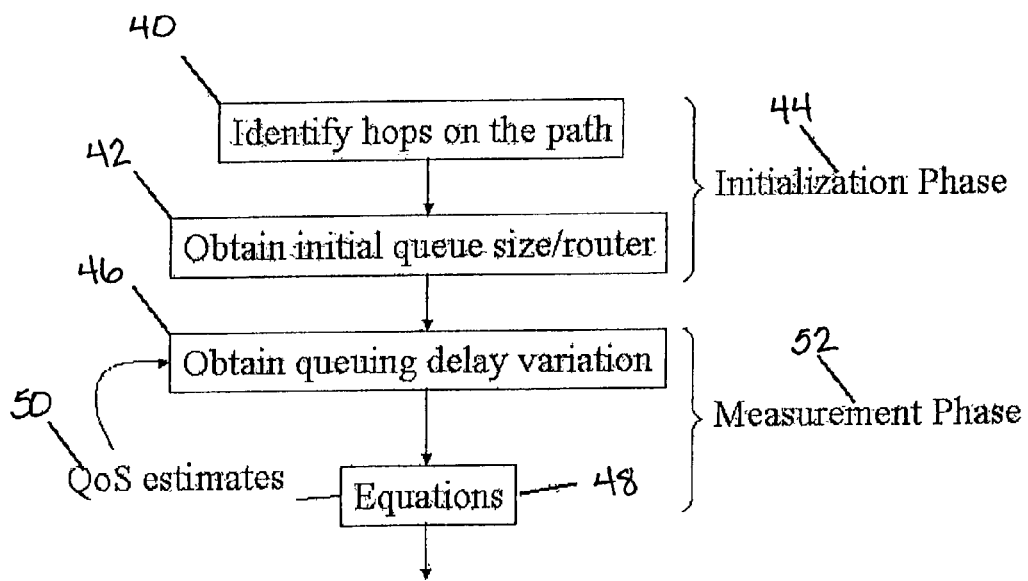
FIG. 4 depicts a flow diagram of the preferred method.

FIG. 4 illustrates the general operation of the method in its preferred embodiment. The essence of the method consists of estimating the variation in queuing delay at successive hops. Then, equations (2), (10), (11) and (12) above are used to deduce the capacity B, available bandwidth AvBw, sum of incoming competing flow rates R and utilization u.

As depicted in FIG. 4, the preferred method begins by identifying network addresses of all routers 12 (hops) along the path from path source 14, 16 to path destination 18, 20, which is represented at step 40. In a preferred embodiment of this method, this is achieved using a Traceroute application. The next step is to obtain a first estimate of the queuing delay at each hop on the path, which is represented in step 42. Steps 40 and 42 form an initialization or bootstrap phase 44 of the preferred method. From then on, pairs of ICMP time-stamp requests are sent to each router 12 on a regular interval. This allows monitoring queuing delay variation 46 at the routers 12 using the equations 48 described above. Each ICMP time-stamp request allows producing one estimate for each router 12 of the QoS parameters capacity, available bandwidth and throughput, which is illustrated as 50 in FIG. 4. In addition, link utilization and size of competing traffic is estimated. Steps 46, 48 and 50 form a measurement phase 52.

Measurement begins by invoking Traceroute application to the destination source 18, 20 to identify all the hops on the end-to-end path. Once the list of hops is obtained, the present invention uses pairs of ICMP time-stamp requests to obtain the variation delay at each of the hops. Below is a discussion of how this is achieved for one hop, the procedure is identical for the remaining hops on the path.

Figure 5:
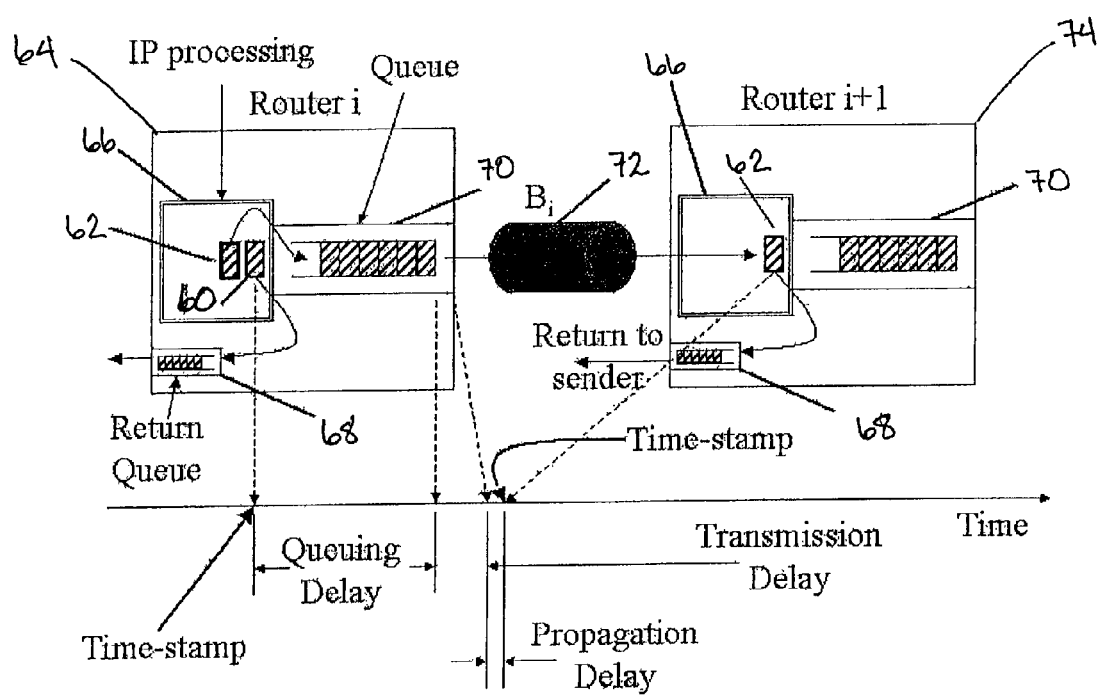
FIG. 5 illustrates an example ICMP time-stamp request processing at a desired pair of hops.

FIG. 5 depicts the preferred embodiment of the processing of a pair of ICMP time-stamp requests 60, 62 at consecutive routers 12. Upon arrival at a first router 64, the first packet 60 receives a time-stamp from an IP processing unit 66. Then, in the preferred embodiment, the same packet 60 returns to its originator through a return queue 68 of the first router 64. The second packet 62 continues through a forward queue 70 through a link 72 and arrives at the IP processing unit 66 of a second router 74 where it receives a time-stamp. Then, in the preferred embodiment, the second packet 62 returns to its originator through the return queue 68 of the second router 74.

To obtain the queuing delay variation at the link from the first router 64 to the second router 74 depicted in FIG. 5, two ICMP time-stamp requests are sent one after another with no time difference between the transmission of the last bit of the first packet and that of the first bit of the second packet. The ICMP request of the first packet is directed towards the first router 64, while that of the second packet is sent to the second router 74. Packets of the same pair are identified using an Identifier or Sequence Number field in the ICMP packet.

The time-stamp at the first router 64 of the first packet of the pair is denoted by $\Theta_i^1$; and that of the second packet of the same pair at the second router 74 by $\Theta^2_{i+1}$. For the purpose of identifying different measurements on a time-scale and without loss of generality, it is assumed that the time-stamps reported by ICMP time-stamp requests of the same pair are both recorded at the time that the second packet of the pair receives its time-stamp. This is equivalent to the notation $\Theta_i^1(j)$ and $\Theta^2_{i+1}(j)$, that both time-stamps are collected at the same time instant j. The following relation gives the difference between these two time-stamps:

$$\Theta^2_{i+1}(j) - \Theta_i^1(j) = \frac{m}{B_i} + q_i(j) + d_{i \to i+1}(j)$$

Where m is the size of the ICMP time-stamp request packet (namely 40 bytes; 20 bytes for each of ICMP and IP), $q_i(j)$ is the queuing delay of the packet pair j waiting to be transmitted from the first router 64 to the second router 74 and $d_{i \to i+1}(j)$ is the propagation delay between the two routers.

A key assumption that is made is that the time-stamp of the first packet not only denotes the time at which the packet is leaving the IP processing stage at the first router 64, but also that of the second packet at the same stage. This assumption requires the two ICMP packets to arrive after the other at the first router 64, i.e., no interfering traffic between the two packets until they reach the first router 64 to be queried. This can be considered realistic for most cases.

Neglecting propagation and processing delay, the equation obtained is:

$$\Theta^2_{i+1}(j) - \Theta_i^1(j) = \frac{m}{B_i} + q_i(j) \quad (17)$$

Equation (17) above is the same as equation (9), i.e., it defines the traversing time across the link 72 from the first router 64 to the second router 74, taking into account the transmission and queuing times at that link and neglecting propagation and processing delays.

After the transmission of the first pair, the sender waits for a user-defined delay α before sending the next pair. In turn, the measurements collected will be $\Theta_i^1(j+1)$ and $$\Theta_{i+1}^2(j+1).$$

Therefore, the queuing delay variation is deduced as follows:

$$[\Theta_{i+1}^2(j+1)-\Theta_{i+1}^2(j)]+[\Theta_i^1(j)-\Theta_i^1(j+1)]=q_i(j+1)-q_i(j) \quad (18)$$

Now using equation (8):

$$u_i(j+1) = \max\left\{\frac{[q_i(j+1)-q_i(j)]}{[\Theta_{i+1}^2(j+1)-\Theta_{i+1}^2(j)]}+1,0\right\} \quad (19)$$

$$u_i(j+1) = \max\left\{\frac{[\Theta_{i+1}^2(j+1)-\Theta_i^1(j+1)]-[\Theta_{i+1}^2(j)-\Theta_i^1(j)]}{\Theta_{i+1}^2(j+1)-\Theta_{i+1}^2(j)}+1,0\right\}$$

Where $u_i(j+1)$ is the utilization at link i 72, between the first and second routers 64, 74 as observed between the two measurement pairs j and j+1 at time $t_j$, respectively. In addition:

$$\Theta_i^2(j+1)-\Theta_i^2(j)=\alpha+\Delta q_i(j)$$

Now, the capacity $B_i$ can be determined using equation (17):

$$B_i = \frac{m}{\Theta_i^2(j)-\Theta_i^1(j)-q_i(j)} \quad (20)$$

The unknown variable in equation (20) is the queuing delay at time $t_j$ in the first router 64. However, we also know that:

$$q_i(j)=q_i(j-1)+\Delta q_i(j-1,j) \quad (21)$$

Where $\Delta q_i(j-1,j)$ is the variation in the queuing delay at the first router 64 as observed between packet pairs j−1 and j. Hence:

$$q_i(j) = \sum_{r=1}^{j} \Delta q_i(r-1, r) + q_i(0) \quad (22)$$

In equation (22), $q_i(0)$ is an estimate of the queuing delay encountered by packets of the first pair sent at the start of the measurement. An estimate of the first queuing delay $q_i(0)$ at the first router 64 is obtained at the very start of the measurement process; first, by sending three consecutive ICMP time-stamp requests, the first one to the first router 64 and the next two to the second router 74. This will lead to the following:

$$\Theta_{i+1}^3(0) - \Theta_{i+1}^2(0) = \frac{m}{B_i(0)}$$

Hence, an estimate of the capacity $B_i$ at time 0 of the link from the first router 64 to the second router 74 is obtained:

$$B_i(0) = \frac{m}{\Theta_{i+1}^3(0) - \Theta_{i+1}^2(0)} \quad (23)$$

The estimate of the capacity Bi will later be refined as the measurements progress as described below. However, the equation (17) at time 0 can also be written:

$$\Theta_{i+1}^2(0) - \Theta_i^1(0) = \frac{m}{B_i(0)} + q_i(0)$$

which, when plugged in to equation (23):

$$q_i(0) = 2 \times \Theta_{i+1}^2(0) - \Theta_i^1(0) - \Theta_{i+1}^3(0) \quad (24)$$

This initial estimate of the queuing delay at link i can be used throughout the measurement process in equation (22). An estimate of the queuing delay can also be repeated at every measurement event through the same procedure of sending three consecutive ICMP packets to obtain a better estimate for use in equation (22).

Once an estimate of $q_i(j)$ is obtained, it is used in equation (20) to estimate link capacity $B_i$. Hence, $B_i$ can be estimated using equations (20), (22) and (24). Now, the sum of all incoming competing flows $R_i$ can be estimated using equations (2), (19), (20), (22) and (24). This is achieved by first estimating capacity $B_i$, then using equation (19) to estimate utilization and equation (2) to find $R_i$. In addition, available bandwidth $AvBw_i$ can be estimated by using equations (2), (12), (19), (20), (22) and (24) through the same process.

In the preferred embodiment of the present invention, all routers 12 are probed regularly and at the same frequency. In yet another preferred embodiment, certain routers 12 can be probed more or less often based on queuing delay variation rate of those routers 12. In the preferred embodiment of the present invention, the path hop addresses are identified first before ICMP pair transmission begins. In yet another preferred embodiment, such pair transmission begins for each hop as soon as that hop is identified.

In the preferred embodiment of the present invention, ICMP time-stamp requests are the standard size as defined for ICMP protocol. In yet another preferred embodiment, dummy data can be added in the IP payload field; hence, increasing transmission time at the router, a useful feature for very fast links.

In the preferred embodiment of the present invention, path identification and time-stamp requests are sent from either source or destination hosts. In yet another preferred embodiment, different time-stamp requests and path identification can be sent from either source or receiver or other hosts on the network simultaneously. In addition, processing of measurements can be achieved at any, some or all hosts on the network including source and destination hosts.

A further extension to the method consists in avoiding the transmission of time-stamp request pairs beyond the slowest link on a path. This is to avoid dispersion between time-stamps as they arrive at the link of interest. To achieve this, probing takes place from either source or destination such that the bottleneck link is avoided. In the preferred embodiment of the present invention, observing the rate of variation of the different links identifies the bottleneck link. Another extension to the method is to further refine the precision of measurements by taking into account propagation delay on the links. This is achieved using a propagation delay estimate.

While the invention has been described in its currently best-known modes of operation and embodiments, other modes, embodiments and advantages of the present invention will be apparent to those skilled in the art and are contemplated herein.

What is claimed is:

1. A method of estimating end-to-end path capacity in a network, comprising:
   probing an end-to-end path to identify addresses of all hops on the end-to-end path;
   generating a pair of time-stamp request packets, wherein the pair of time-stamp request packets comprise a first time-stamp request packet and a second time-stamp request packet;
   transmitting said pair of time-stamp request packets to a first hop on the end-to-end path, wherein no interfering traffic is received between the first and second time-stamp request packets at the first hop;
   transmitting the second time-stamp request packet to a second hop on the end-to-end path from the first hop on the end-to-end path;
   generating a first time-stamp in response to said first time-stamp request packet with said first hop;
   generating a second time-stamp in response to the second time-stamp request packet with said second hop; and
   processing said first time-stamp and said second time-stamp of the pair of time-stamp request packets to produce at least one Quality of Service (QoS) estimate.

2. The method of claim 1, wherein said probing identify hops on said end-to-end path uses a Traceroute application.

3. The method of claim 1, wherein said probing identify hops on the end-to-end path is generated from a source node.

4. The method of claim 1, wherein said probing identify hops on the end-to-end path is generated from a destination node.

5. The method of claim 1, wherein said probing identify hops on the end-to-end path is generated from a source node and a destination node.

6. The method of claim 1, wherein said processing said first and second time-stamps is performed at a source node.

7. The method of claim 1, wherein said processing said first and second time-stamps is performed at a destination node.

8. The method of claim 1, wherein said processing said first and second time-stamps is performed at a source node and a destination node.

9. The method of claim 1, wherein said first and second time-stamp request packets are ICMP requests.

10. The method of claim 1, further comprising regularly probing the hops on the end-to-end-path by generating additional pairs of time-stamp request packets to be transmitted to one or more of the hops on the end-to-end path, and wherein periodically generating additional pairs of time-stamp request packets comprises generating pairs of time-stamp request packets more often to specific hops on said end-to-end path.

11. The method of claim 10, wherein hops subject to more frequent probing are determined based on at least one of: a variation in their utilization, a queuing delay, a queue size, a processing delay, an available bandwidth, and a congestion status.

12. The method of claim 1, further comprising regularly probing the hops on the end-to-end-path by generating additional pairs of time-stamp request packets to be transmitted to one or more of the hops on the end-to-end path, and wherein periodically generating additional pairs of time-stamp request packets comprises generating time-stamp requests less often to specific hops on the end-to-end path.

13. The method of claim 12, wherein hops subject to less frequent probing are determined based on at least one of: a variation in their utilization, a queuing delay, a queue size, a processing delay, an available bandwidth, a congestion status.

14. The method of claim 1, further comprising introducing certain latency between consecutive time-stamp request packet transmissions.

15. The method of claim 1, further comprising increasing the size of at least one of the first and second time-stamp request packets by adding dummy data to the at least one time-stamp request packet to increase sensitivity in the case of a fast link.

16. The method of claim 9, further comprising increasing the size of at least one of the first and second ICMP requests by adding dummy data in an IP payload field of the at least one ICMP request to increase sensitivity in the case of a fast link.

17. The method of claim 1, wherein said QoS estimate comprises a link and path capacity.

18. The method of claim 1, wherein said QoS estimate comprises an estimate of queuing delay at said hop.

19. The method of claim 1, wherein said QoS estimate comprises an estimate of link and path utilization.

20. The method of claim 1, wherein said QoS estimate comprises an estimate of link and path available bandwidth.

21. The method of claim 1, wherein said QoS estimate comprises an estimate of interfering flows at said hop.

22. The method of claim 1, further comprising restarting said probing in the case of a change in routing tables.

23. A method of estimating end-to-end path capacity in a network, comprising:
   probing an end-to-end path to identify addresses of a plurality of hops on the end-to-end path;
   generating a pair of time-stamp request packets with an origination node;
   sending said pair of time-stamp request packets to at least one respective hop on the end-to-end path with an origination address of said origination node spoofed to that of another hop on said network such that replies of the pair of time-stamp request packets are sent to the other hop on said network instead of the origination node, wherein no interfering traffic is received between the pair of time-stamp request packets at the at least one hop on the end-to-end path;
   transmitting one of the pair of time-stamp request packets to a second hop from the at least one hop;
   generating at least one time-stamp with the at least one hop;
   generating at least one time-stamp with the second hop; and
   processing in at least one hop on said network said at least one time-stamp generated with the said hop and the second hop to produce a Quality of Service (QoS) estimate.

24. The method of claim 23, wherein the probing the path uses a Traceroute application.

25. The method of claim 23, wherein the origination address is that of a source node on said end-to-end path.

26. The method of claim 23, wherein the origination address is that of a destination node on said end-to-end path.

27. The method of claim 23, wherein the probing the path generated from a source node.

28. The method of claim 23, wherein the probing the path is generated from a destination node.

29. The method of claim 23, wherein the probing the path is generated from a source node and a destination node.

30. The method of claim 23, said QoS estimate comprises an estimate of link and path capacity.

31. The method of claim 23, wherein said QoS estimate comprises an estimate of queuing delay at said hop.

32. The method of claim 23, wherein said QoS estimate comprises an estimate of link and path utilization.

33. The method of claim 23, wherein said QoS estimate comprises an estimate of link and path available bandwidth.

34. The method of claim 23, wherein said QoS estimate comprises an estimate of interfering flows at said hop.

35. The method of claim 23, further comprising refining said QoS estimate by taking into consideration a propagation delay.

36. A method of estimating end-to-end path Quality of Service (QoS) in a network, comprising:
probing an end-to-end path to identify a plurality of hops with a node;
generating a pair of time-stamp request packets with said node;
transmitting said pair of time-stamp request packets to at least one hop, wherein no interfering traffic is received between the pair of time-stamp request packets at the at least one hop;
generating a first time-stamp with said hop;
transmitting said first time-stamp to said node;
transmitting one of the pair of time-stamp request packets to another hop from the at least one hop;
generating a second time-stamp with the another hop;
transmitting said second time-stamp to said node; and
processing the first and second time-stamps to produce a QoS estimate.

37. The method of claim 36, wherein said node may be selected from a group of nodes including a source node, a destination node or an independent node.

38. The method of claim 36, wherein said QoS estimate comprises a link and path capacity.

39. The method of claim 36, wherein said QoS estimate comprises an estimate of queuing delay at said hop.

40. The method of claim 36, wherein said QoS estimate comprises an estimate of link and path utilization.

41. The method of claim 36, wherein said QoS estimate comprises an estimate of link and path available bandwidth.

42. The method of claim 36, wherein said QoS estimate comprises an estimate of interfering flows at said hop.

43. A method of estimating a Quality of Service (QoS) estimate, comprising:
probing an end-to-end path to identify addresses of all hops on the end-to-end path;
generating a group of five time-stamp request packets to be transmitted to each of the hops on the end-to-end path;
transmitting the group of five time-stamp request packets to each of the hops on the end-to-end path, wherein the first three time-stamp request packets are used to determine initial conditions for measurements of the corresponding hop, wherein the remaining two time-stamp request packets are used to determine an estimate of a total time spent by a time-stamp request packet at the corresponding hop, wherein transmitting comprises:
transmitting three consecutive time-stamp requests to a corresponding hop, the first one to the corresponding hop, and the next two to the subsequent hop; and
transmitting the remaining two time-stamp request to the corresponding hop, the first one to the corresponding hop, and the next one to the subsequent hop, wherein the remaining two time-stamp request packets are a pair of time-stamp request packets comprising a first time-stamp request packet and a second time-stamp request packet, and wherein no interfering traffic is received between the first and second time-stamp request packets at the corresponding hop;
generating a first time-stamp in response to the first time-stamp request packets with the corresponding hop;
generating a second time-stamp in response to the second time-stamp request packets with a subsequent hop; and
processing the first time-stamp and the second time-stamp of the pair of time-stamp request packets to determine the estimate of the total time spent by the time-stamp request packet at the corresponding hop.

44. The method of claim 43, further comprising regularly transmitting another pair of time-stamp request packets to each hop on the end-to-end path to determine an updated estimate of a total time spent by a time-stamp request at each of the hops on the end-to-end path, wherein the second of the another pair of time-stamp request packets is transmitted to a next hop from the hop that receives the another pair of time-stamp request packets.

45. The method of claim 44, further comprising inferring queuing delay variation at each hop on the end-to-end path using the regularly updated estimates.

46. The method of claim 45, further comprising determining an estimate of utilization in the direction of the path at each hop on the end-to-end path using the total time spent by the time-stamp request at each hop and the queuing delay variation at each hop on the end-to-end path, wherein the estimate of utilization refers to the fraction of transmission resources not used by competing traffic at the each hop.

47. The method of claim 45, further comprising determining an estimate of available bandwidth of each link in the direction of the path using the regularly updated estimates of the total time spent by the time-stamp request at each hop and the queuing delay variation at each hop on the end-to-end path, wherein the estimate of the available bandwidth of each link is representative of the rate the link can sustain incoming traffic without increasing the total time spent by the time-stamp request at the particular link.

48. The method of claim 45, further comprising determining an estimate of incoming traffic from competing sources to each link in the direction of the path using the regularly updated estimates of the total time spent by the time-stamp request at each hop and the queuing delay variation at each hop on the end-to-end path.

49. A method of estimating end-to-end path capacity in a network, comprising:
probing an end-to-end path to identify addresses of a plurality of hops on the end-to-end path;
generating a group of time-stamp request packets including at least a pair of time-stamp request packets for each hop of the plurality of hops on the end-to-end path;
transmitting the group of time-stamp request packets to each hop on the end-to-end path, wherein no interfering traffic is received between the pair of time-stamp request packets at said hop;
transmitting one of the pair of time-stamp request packets to a subsequent hop on the end-to-end path from the said hop; and
determining an estimate of a total time spent by a time-stamp request packet at a particular hop using time stamps generated in response to the pair of time-stamp request packets transmitted to the particular hop and to the subsequent hop on the end-to-end path from the particular hop.

50. The method of claim 49, wherein the group of time-stamp request packets comprise five packets, and wherein the five packets comprise the pair of time-stamp request packets and three time-stamp request packets, and wherein the method further comprises determining initial conditions for the measurements of the particular hop using the three time-stamp request packets.

* * * * *